Patented Oct. 12, 1948

2,451,134

UNITED STATES PATENT OFFICE 2,451,134

POULTRY FOOD

Gustav A. Walldov, Marlboro, N. J.

No Drawing. Application April 4, 1944,
Serial No. 529,491

6 Claims. (Cl. 99—4)

This invention relates to a poultry food.

While searching for an improved poultry food, I discovered that gelatine in powdered form, mixed with a mash, produced certain advantages, and after further tests I found that the most attractive or appetizing way to feed the gelatine to poultry was in noodle form wherein digested gelatine is made into shapes like macaroni or spaghetti, and that when these noodles are dried or dehydrated and broken up into suitable lengths and properly handled, they make an excellent poultry food especially for chickens. I further discovered that the best way to handle the noodles was to first soak them in cold water for a few hours or overnight and then mix them with a dry mash. The noodles in the mash then have the appearance of worms and thereby greatly attract the poultry. While I have tried colored gelatine noodles, the extra expense required does not seem to be warranted.

Some of the advantages of this food are as follows:

There is a great improvement in the appetite of the poultry and a greatly increased egg production. Another advantage is that the cold weather does not affect the poultry fed with the gelatine product as much as it does those fed with only the regular feed, and their egg production is not lowered due to the cold.

Another advantage is that the gelatine-fed poultry has a much lower mortality rate. Also, baby chicks hatched from eggs laid by gelatine-fed hens are much stronger and hardier.

I have found from my own experience and contact with other farmers who raise Leghorn chickens, that they are troubled with "barbarism" at one time or another. By "barbarism" I mean that one chick begins to pick at another chick until blood comes to the surface, and when they see the red color, they actually tear each other to pieces. As a remedy for barbarism, some farmers have tried bad-tasting, red-colored ointments, and others have tried putting red-colored glasses or blinders on the individual birds. All this means extra time and expense. From my study of the matter, it seems to me that barbarism is caused by lack of some ingredient in the poultry diet; most likely it is the lack of protein since blood and meat are protein that are added occasionally to poultry mash. I have discovered over quite a lengthy period of time that barbarism is eliminated by feeding poultry with my improved type of food containing gelatine, especially in the form of gelatine worms.

Another advantage of this improved type of food is that the poultry grow faster and their meat is much more tender, requiring less time for roasting or frying.

I have definitely determined these advantages by test comparison between one flock of chickens fed exactly at the same time and manner with dry and wet mash but without the gelatine, and another similar group fed with the gelatine worms.

There are possibly other and minor advantages which I have not enumerated or discovered.

From my experience with this food, I have found that chickens should not be fed gelatine every day, but only two or three days a week, which is all that is required to at least keep egg production up to the maximum.

While I have fed the gelatine in different forms, I prefer the noodle form—and that in the manner heretofore described. I have seen one chicken chase another having a noodle-worm in its mouth in order to get at least a part of it, and this gives the poultry exercise and consequently makes them eat more and grow faster.

There is another advantage of my improved poultry food which, from my investigations, seems evident and on which I may have more evidence at a later date, and that is that chickens hatched from hens fed on my improved food, are almost all females. Of course why this is so, I do not at this time know, but I am sure of the other advantages which have heretofore been set forth.

What I claim is:

1. A food for poultry comprising gelatine in the form of short noodles mixed with a mash.

2. The process of preparing a poultry food which consists in forming gelatine into dry noodle form, breaking up the noodles into short lengths and soaking them in preferably cold water for a few hours and then mixing them with a dry mash.

3. The process of preparing a poultry food which consists in forming gelatine into noodle form, breaking or cutting up the noodles into pieces of short length, and then after wetting the pieces sufficiently, mixing them with a suitable mash.

4. The process of preparing a poultry food which consists in forming and treating gelatine to resemble an angle-worm, and then mixing the "worms" with a suitable mash.

5. Process for making a poultry food which consists in forming dry noodles from gelatine, breaking up and soaking the noodles in water for several hours and then finally mixing the noodles with preferably a dry mash.

6. Process of making a poultry food which consists in forming short noodles of gelatine, then softening and mixing the noodles with a dry mash.

GUSTAV A. WALLDOV.

REFERENCES CITED

The following references are of record in the file of this patent:

UNITED STATES PATENTS

| Number | Name | Date |
|---|---|---|
| 1,057,215 | Bohrmann | Mar. 25, 1913 |

FOREIGN PATENTS

| Number | Country | Date |
|---|---|---|
| 11,711 | Great Britain | 1914 |
| 15,800 | Great Britain | 1914 |